(12) United States Patent
Vanderhoof et al.

(10) Patent No.: US 7,481,869 B2
(45) Date of Patent: Jan. 27, 2009

(54) DRY GAS PRODUCTION SYSTEMS FOR PRESSURIZING A SPACE AND METHODS OF OPERATING SUCH SYSTEMS TO PRODUCE A DRY GAS STREAM

(75) Inventors: Troy I. Vanderhoof, Wylie, TX (US); Brian Cross, Double Oak, TX (US); Roger Hanson, Dallas, TX (US); Sandy B. Becker, Richardson, TX (US)

(73) Assignee: Andrew LLC, Hickory, NC (US)

( * ) Notice: Subject to any disclaimer, the term of this patent is extended or adjusted under 35 U.S.C. 154(b) by 484 days.

(21) Appl. No.: 11/205,848

(22) Filed: Aug. 17, 2005

(65) Prior Publication Data

US 2007/0039464 A1 Feb. 22, 2007

(51) Int. Cl.
*B01D 53/22* (2006.01)
(52) U.S. Cl. ............... 96/4; 96/7; 96/9; 96/10; 96/422; 95/45; 95/52; 95/23; 55/385.1; 55/467; 55/472; 55/481; 55/502
(58) Field of Classification Search ............ 96/4, 96/6, 7, 9, 10, 422; 95/45, 52, 23; 55/385.1, 55/467, 472, 478, 481, 502, DIG. 17; 210/640, 210/641, 650
See application file for complete search history.

(56) References Cited

U.S. PATENT DOCUMENTS

| | | | | |
|---|---|---|---|---|
| 3,184,592 A | 5/1965 | Cibie | ............... | 240/41.35 |
| 4,153,434 A | 5/1979 | Settlemyer | ............... | 55/163 |
| 4,614,089 A | 9/1986 | Dorsey | ............... | 62/158 |
| 4,721,515 A | 1/1988 | Hata et al. | ............... | 55/162 |
| 4,748,822 A | 6/1988 | Erbs et al. | ............... | 62/213 |
| 4,806,134 A | 2/1989 | Lhota | ............... | 55/162 |
| 4,944,776 A | 7/1990 | Keyser et al. | ............... | 55/16 |
| 4,953,063 A | 8/1990 | Nino | ............... | 362/61 |

(Continued)

FOREIGN PATENT DOCUMENTS

DE 3231519 3/1984

(Continued)

OTHER PUBLICATIONS

Dialog English Language Abstract for EP 1 433 999, Jun. 30, 2004.

(Continued)

*Primary Examiner*—Jason M Greene
(74) *Attorney, Agent, or Firm*—Wood, Herron & Evans LLP

(57) ABSTRACT

A dry gas production system for supplying dry gas to a pressurized space, such as an underground conduit or an aerial cable. The dry gas production system may include a modular enclosure that has a removable support to which multiple dry gas production modules are mounted. The support may be a mobile rack wheeled inside the enclosure and likewise removed from the enclosure while supporting the dry gas production modules. The dry gas production system may include multiple dry gas production modules that are operated as required to meet the dry gas demand for the pressurized space. The module compressor may include a variable frequency drive for driving the compressor motor at different speeds and may optionally include a mount with vibration isolation.

16 Claims, 13 Drawing Sheets

U.S. PATENT DOCUMENTS

| | | | |
|---|---|---|---|
| 5,030,251 A | 7/1991 | Rice et al. ............. | 55/16 |
| 5,050,397 A | 9/1991 | Sugiyama et al. ........ | 62/175 |
| 5,118,327 A | 6/1992 | Nelson et al. .......... | 55/16 |
| 5,131,929 A | 7/1992 | Brockmann et al. ....... | 55/16 |
| 5,171,336 A | 12/1992 | Shulick ................ | 55/271 |
| 5,185,014 A * | 2/1993 | Prasad ................. | 95/54 |
| 5,209,764 A | 5/1993 | Eberling ............... | 55/162 |
| 5,343,384 A | 8/1994 | Fisher et al. .......... | 364/133 |
| 5,439,507 A | 8/1995 | Barbe et al. ........... | 95/23 |
| 5,470,379 A | 11/1995 | Garrett ................ | 96/4 |
| 5,522,707 A | 6/1996 | Potter ................. | 417/4 |
| 5,681,368 A | 10/1997 | Rahimzadeh ............. | 95/19 |
| 5,743,714 A | 4/1998 | Drob ................... | 417/2 |
| 5,762,690 A | 6/1998 | Hermann ................ | 96/4 |
| 5,791,759 A | 8/1998 | Dassanayake et al. ..... | 362/61 |
| 5,797,729 A | 8/1998 | Rafuse, Jr. et al. ..... | 417/3 |
| 5,885,329 A | 3/1999 | Hermann ................ | 95/22 |
| 6,125,553 A | 10/2000 | Quinn et al. ........... | 34/332 |
| 6,155,079 A | 12/2000 | Vigor et al. ........... | 62/643 |
| 6,257,833 B1 | 7/2001 | Bates .................. | 417/4 |
| 6,269,650 B1 | 8/2001 | Shaw | |
| 6,287,083 B1 | 9/2001 | Hase et al. ............ | 417/216 |
| 6,296,683 B1 * | 10/2001 | Koch ................... | 95/23 |
| 6,330,804 B1 | 12/2001 | Uno et al. ............. | 62/175 |
| 6,474,950 B1 | 11/2002 | Waldo .................. | 417/12 |
| 6,485,545 B1 * | 11/2002 | Ohlrogge et al. ........ | 96/4 |
| 6,519,957 B2 | 2/2003 | Huh et al. ............. | 62/175 |
| 6,540,817 B1 | 4/2003 | Hachimaki .............. | 96/8 |
| 6,540,818 B2 | 4/2003 | Hachimaki .............. | 96/8 |
| 6,579,067 B1 | 6/2003 | Holden ................. | 417/2 |
| 6,585,792 B2 * | 7/2003 | Schneider et al. ....... | 55/481 |
| 6,593,525 B1 | 7/2003 | Vanderhoof et al. ...... | 174/50 |
| 6,616,735 B1 | 9/2003 | Burban et al. .......... | 96/8 |
| 6,659,726 B2 | 12/2003 | Holden ................. | 417/2 |
| 6,695,893 B2 | 2/2004 | Hoffman et al. ......... | 95/21 |
| 6,776,820 B2 * | 8/2004 | Bikson et al. .......... | 95/52 |
| 6,795,753 B2 | 9/2004 | Vanderhoof et al. ...... | 700/301 |
| 6,817,198 B2 | 11/2004 | Wilson et al. .......... | 62/228.3 |
| 6,887,293 B1 * | 5/2005 | Abad et al. ............ | 95/19 |
| 2001/0035092 A1 | 11/2001 | Hachimaki et al. | |
| 2003/0183077 A1 | 10/2003 | Hoffman et al. | |
| 2004/0194483 A1 | 10/2004 | Hoyt et al. | |
| 2004/0228139 A1 | 11/2004 | Taniuchi ............... | 362/639 |

FOREIGN PATENT DOCUMENTS

| | | |
|---|---|---|
| DE | 35 25 083 | 1/1987 |
| DE | 3702845 | 8/1988 |
| DE | 8807292 U1 | 10/1989 |
| DE | 29608952 U1 | 8/1996 |
| DE | 19739144 A1 | 3/1999 |
| EP | 0212101 | 3/1987 |
| EP | 1 213 532 A2 | 6/2002 |
| EP | 1 433 999 A1 | 6/2004 |
| EP | 1 213 532 A3 | 7/2004 |
| FR | 2 628 082 | 9/1989 |
| FR | 2 637 046 | 9/1989 |
| FR | 2728803 A1 | 7/2005 |
| GB | 2 400 241 | 10/2004 |
| JP | 55020060 | 2/1980 |
| JP | 63123421 | 5/1988 |
| JP | 09326617 | 12/1997 |
| JP | 2000161237 | 6/2000 |
| JP | 2003-222469 * | 8/2003 |
| JP | 2003222469 | 8/2003 |

OTHER PUBLICATIONS

Dialog English Language Abstract for FR 2 637 046, Sep. 28, 1989.
French Search Report dated May 13, 2005.
Alltech Associates, Inc., *Parker Balston NMR and Ultra Dry Air Generators,* Data Sheet, No. 80251D, 5 pages (2002).
Stookey, D.J., *Gas Separation Membrane Applications,* www3.interscience.wiley.com, Summary, Undated (2 pages).
Ohanian, S. et al., *Series of Parallel Arrangement in a Two-Unit Compressor Station,* Transactions of the ASME, vol. 124, Oct. 2002 (pp. 936-941).
Terra Universal, Inc., *Quick-Start Operating Guide, Dry Gas Generator,* Document No. 1800-66, 3 pages (May 2002).
Honeywell, *The "How To's" of Compressed Air,* Undated literature, 2 pages.
Fish, Allan J., *Membrane Air Dryers Fill A Gap,* Plant Engineering (Barrington, IL), v. 57, n. 2, Feb. 2003 (4 pages).
Andrew Corporation, *Dehydrators,* www.andrew.com, Catalog 38, p. 252 (undated).
Pacific Air Compressors, *Champion Clean Air Series,* www.air-compressorsvacuum-pumps.com/cleanair.htm, 7 pages (undated).
Josef Roider; European Search Report; Apr. 16, 2007; Munich, Germany.

* cited by examiner

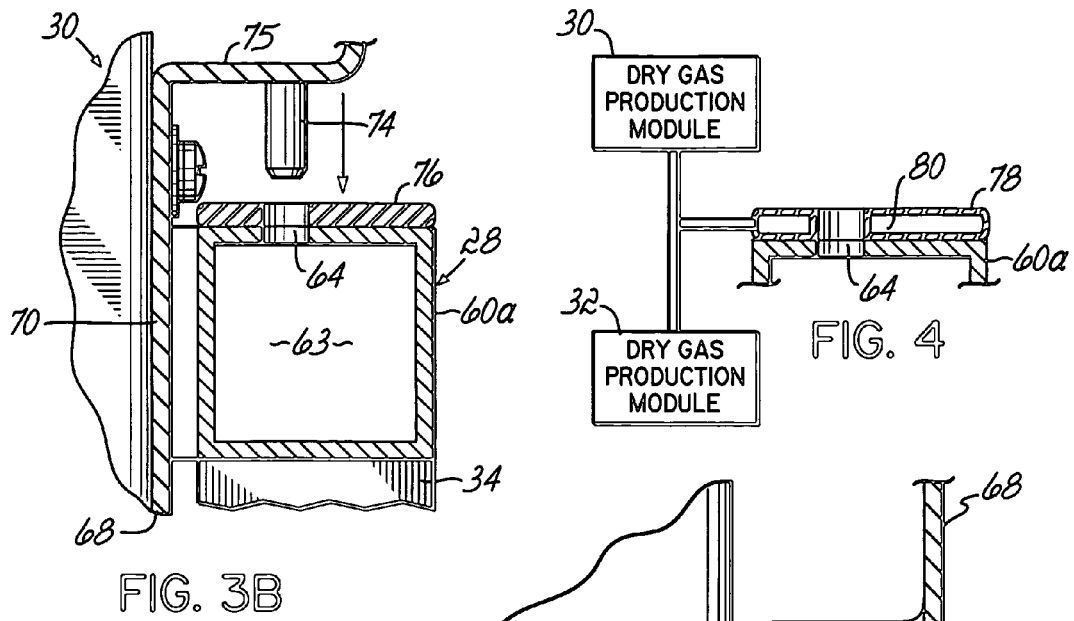
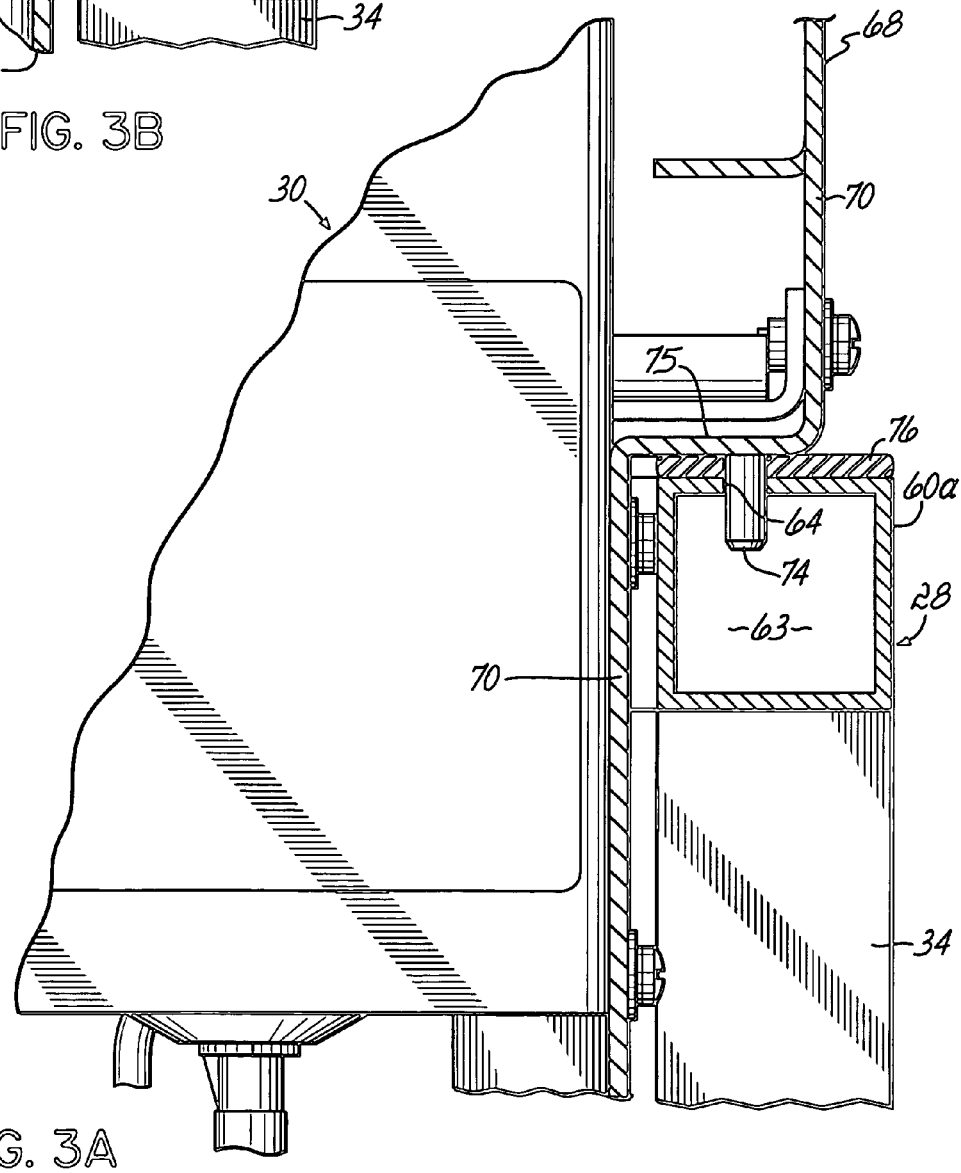

DRY GAS PRODUCTION SYSTEMS FOR PRESSURIZING A SPACE AND METHODS OF OPERATING SUCH SYSTEMS TO PRODUCE A DRY GAS STREAM

FIELD OF THE INVENTION

This invention relates to apparatus for supplying dry gas to a space, such as an underground conduit or aerial cable, and methods of operating such apparatus to supply dry gas to these spaces.

BACKGROUND OF THE INVENTION

Underground conduits and aerial cables which may, for example, carry multiple bundles of twisted wire pairs constituting telephone wiring, are normally pressurized with a dry gas to prevent ingress of moisture through, for example, leaky joints between conduit or cable sections. Moisture ingress may lead to condensation or build up. Unless prevented, the presence of moisture in the atmosphere inside these underground conduits and aerial cables may cause immediate and permanent damage to moisture sensitive materials therein or cause operation failures due to, for example, corrosion and voltage arcing.

Normally, the dry gas source supplying these underground conduits and aerial cables consists of one or more air dryers located at a central office. Standard air dryers nominally consist of air compressors, air drying devices, a dry air distribution network consisting of pneumatically coupled pipes and tubing, and associated operating controls. Cable dryers feed underground conduits, for example, through tubing that extends into underground vaults. These underground conduits must be pressurized along their entire length, which may extend sub-surface for many miles. Leaks and other losses create a variable demand on the supply of dry gas to maintain the desired pressure within the underground conduit. Moisture ingress is prevented by maintaining a constant positive pressure of dry gas on the underground conduit, such that the dry gas flows out of the underground conduit and blocks the inflow of moist ambient air.

Conventional gas dryers utilize established technologies for generating adequate amounts of dry gas to satisfy the variable demand. For example, many standard gas dryers use conventional "liquid-ring" style compressors, which are compact but are also complex and maintenance intensive. These compressors are forced to start and stop at intermittent intervals as the cyclic demand for dry gas fluctuates, which causes component wear that accelerates the maintenance requirement and may result in component failure.

Conventional gas dryers also rely on either conventional refrigerant drying or, more commonly, conventional pressure swing adsorption (PSA) to generate a stream of dry gas. PSA apparatus and the apparatus used to practice refrigerant drying are complex, maintenance intensive, and tend to be unreliable over extended operating periods. In particular, PSA technology uses a drying media which can become ineffective over time.

What is needed, therefore, is a gas dryer for underground conduits and aerial cables that has a simple construction and lasting reliability and methods of operating such gas dryers that overcome these and other disadvantages of conventional gas dryers and conventional methods of operating such gas dryers.

BRIEF DESCRIPTION OF THE DRAWINGS

FIG. 3A is a partial cross-sectional view taken generally along line 3A-3A in FIG. 2B;

FIG. 3B is a detailed view of a portion of FIG. 3A;

FIG. 4 is a cross-sectional view of a vibration isolator in accordance with an embodiment of the invention;

DETAILED DESCRIPTION OF THE INVENTION

Figure 1A:
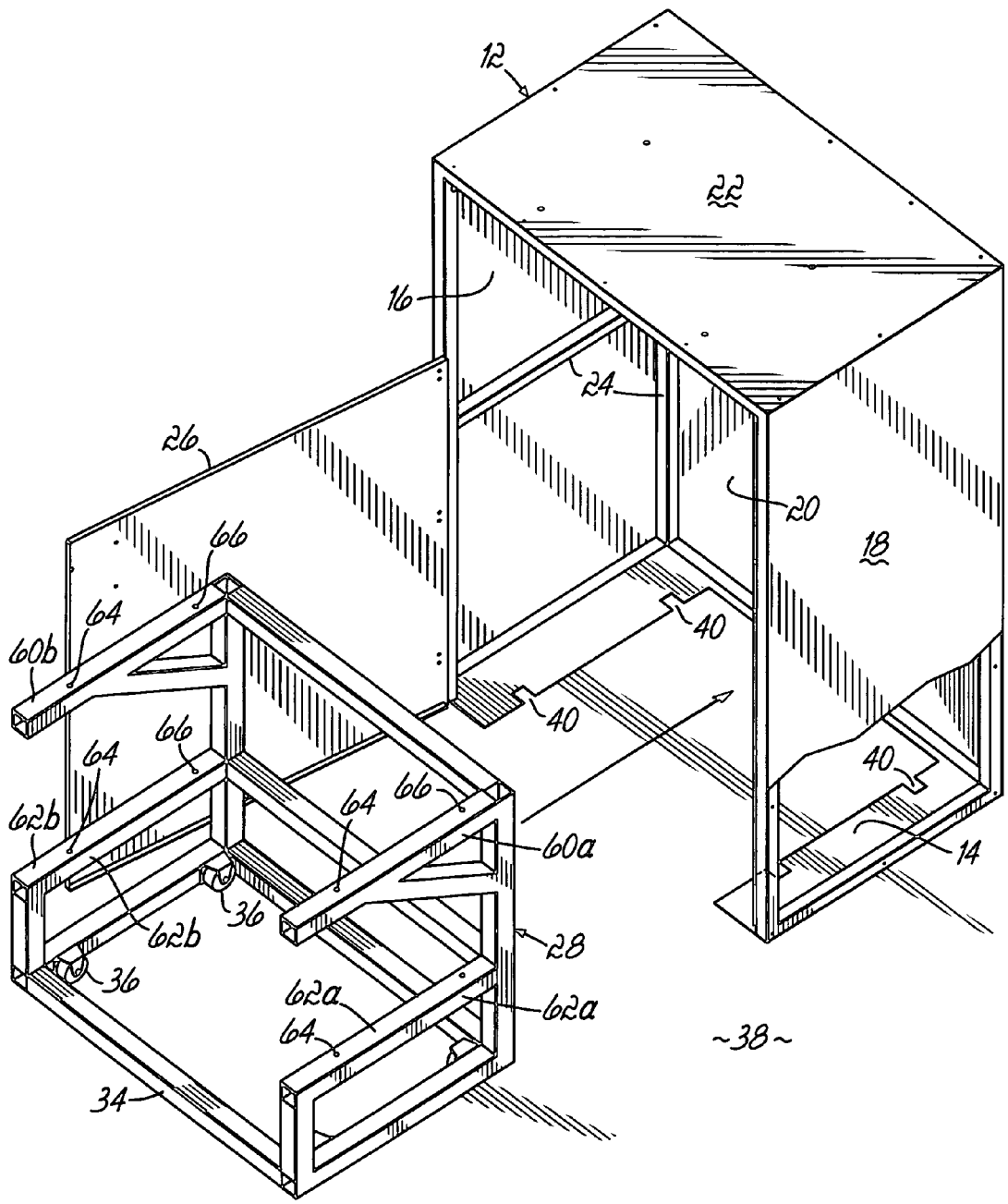
FIG. 1A is a disassembled perspective view depicting a cabinet and a mobile rack for a dry gas production system in accordance with an embodiment of the invention and in which the individual dry gas production modules normally mounted to the installation rack are omitted for clarity.
Figure 1B:
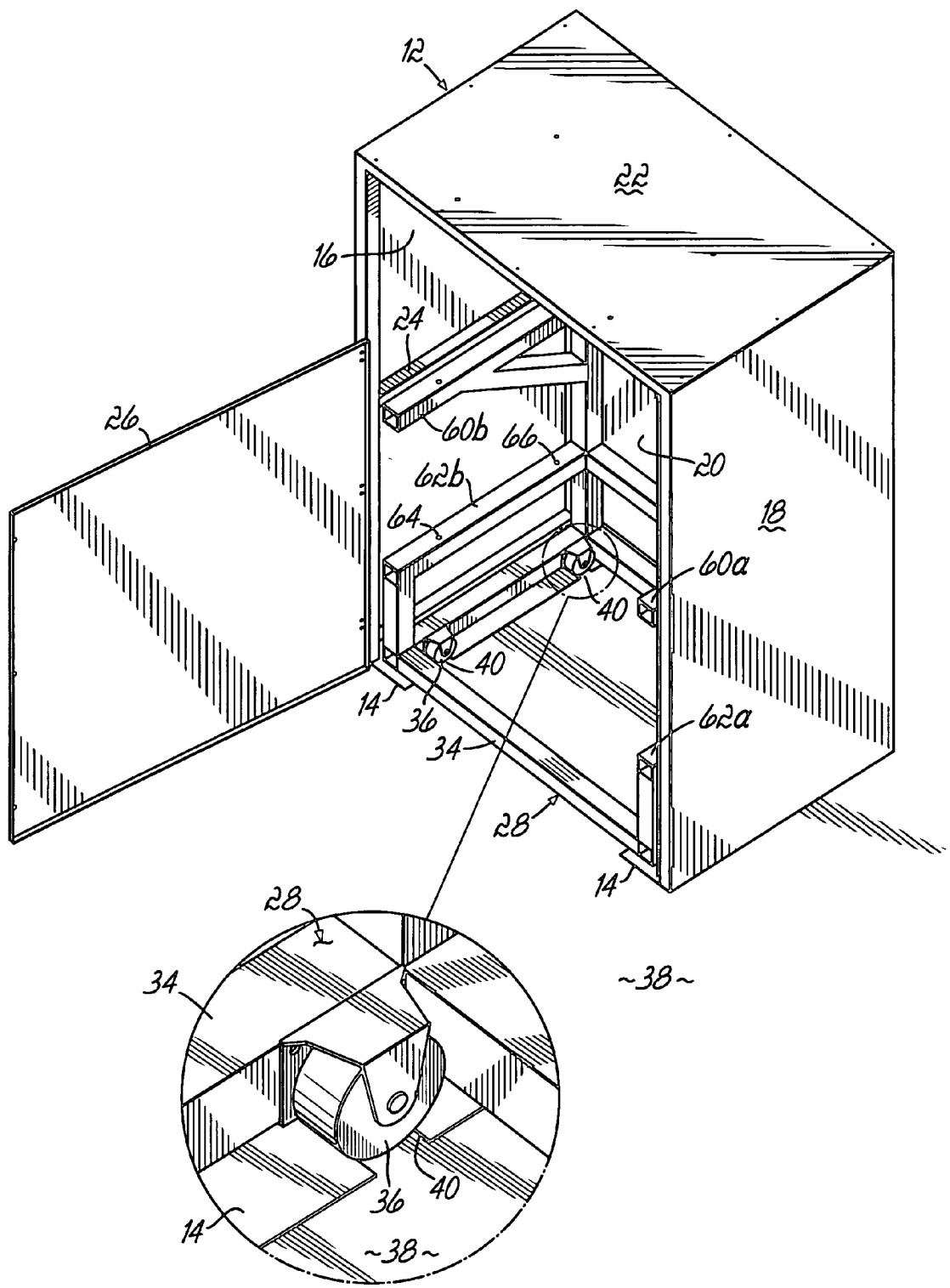
FIG. 1B is an assembled perspective view similar to FIG. 1A in which the mobile rack is installed in the cabinet.

With reference to FIGS. 1A and 1B, an enclosure or cabinet 12 for a dry gas production system 10 (FIGS. 2A-C) includes a lower panel 14, opposite side panels 16, 18 extending upwardly from side edges of the lower panel 14, a rear panel 20 extending upwardly from a rear edge of the lower panel 14, and a top panel 22 which is connected to the upper ends of the side panels 16, 18 and the rear panel 20. The panels 14, 16, 18, 20, 22 are secured with, for example, conventional fasteners to the exterior of a frame 24 of interconnected cross beams and vertical beams to bound the enclosed space and are generally constituted by thin rectangular sheet metal plates.

Figure 2A:
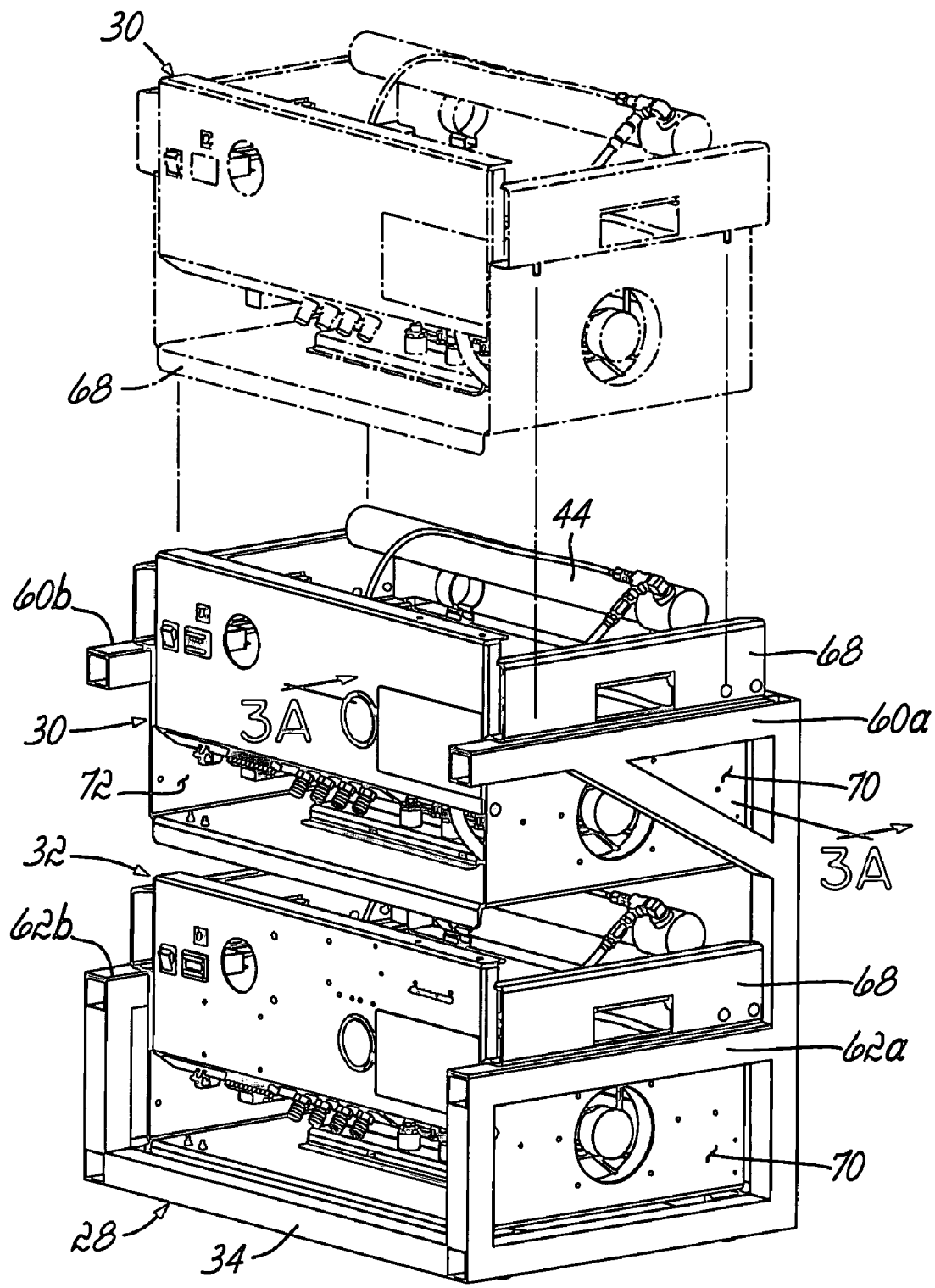
FIG. 2A is an assembled view of the mobile rack of FIG. 1 in which a pair of dry gas production modules are mounted.
Figure 2B:
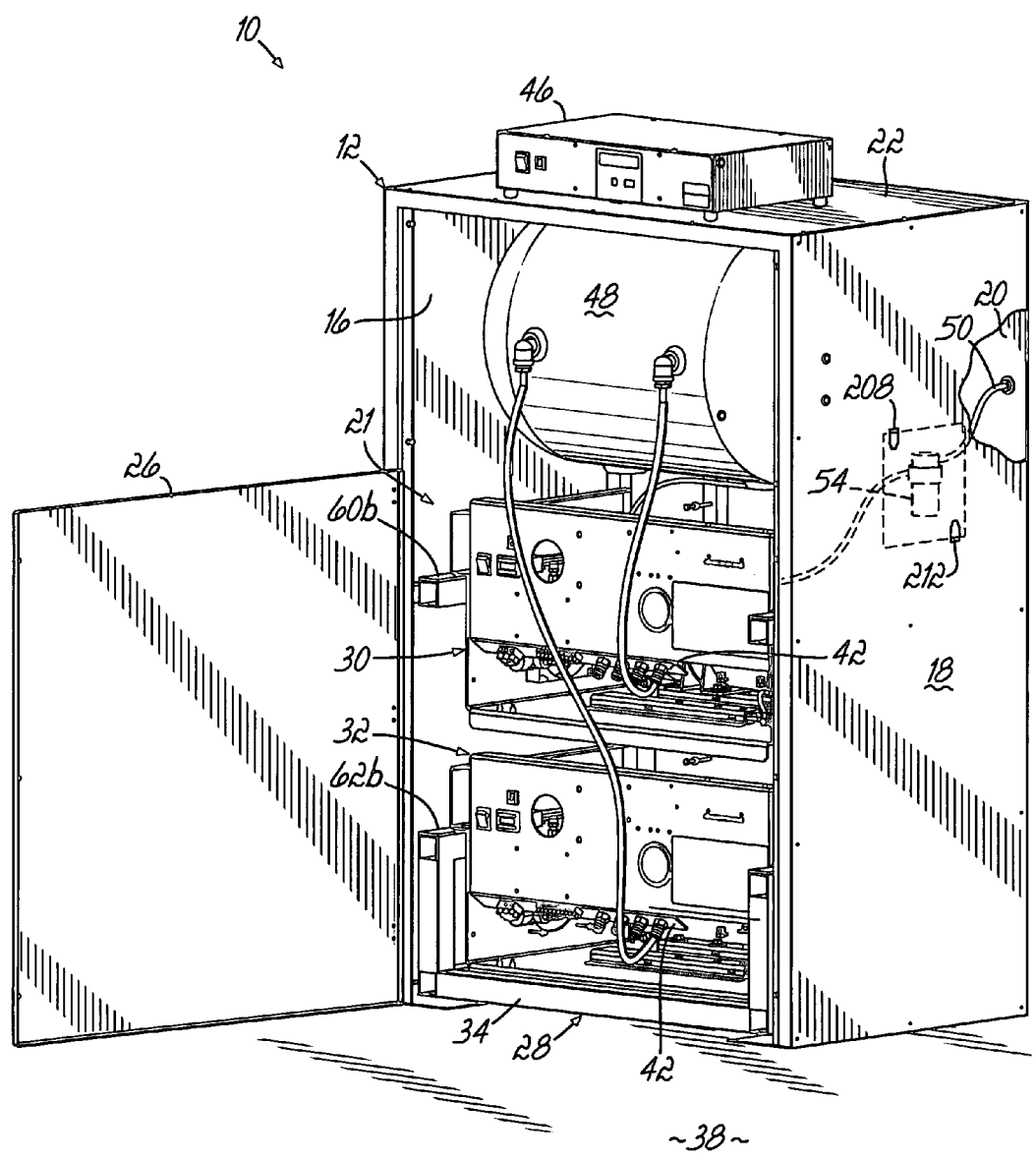
FIG. 2B is a perspective view showing the assembled dry gas production system.

Access to the interior of the cabinet 12 is afforded by an access panel 26 attached to the frame 24. The access panel 26 may be manipulated between a removed or opened condition, as depicted in FIGS. 2A and 2B, and a closed position (not shown) for controlling access to an access opening 21. The access panel 26 may be is secured about its periphery to the cabinet 12 with conventional fasteners. Another smaller fixed panel (not shown) closes the open gap between the upper edge of the access panel 26 and the top panel 22.

A mobile rack 28 is adapted to receive and support one or more dry gas production modules 30, 32 (FIG. 2) with module 30 above module 32. The modules 30, 32 are mounted to the rack 28 with a stacked arrangement. The rack 28 is equipped with an open frame 34 of interconnected vertical and horizontal beams and a plurality of, for example, four rolling members 36, such as casters, wheels, or rollers, that contact the floor 38 at various support locations. Each rolling member 36 is attached to the frame 34 at, or near, one corner about the base of the rack 28.

When the access panel 26 is opened, the mobile rack 28 may be moved into the cabinet 12 to provide an operating configuration for producing dry gas and may be removed from the cabinet 12 to access the dry gas production modules 30, 32. Advantageously, the combination of the fixed cabinet 12 and mobile rack 28 eases installation and provides simplified maintenance accessibility. The rack 28 defines a module support that permits the dry gas production modules 30, 32 to be removed from their respective operating positions inside the cabinet 12 to serviceable position at least partially outside of the cabinet 12 without the service technician having to physically lift or bear the full weight of the module 30.

A controller 46 and a gas reservoir 48 are operatively coupled with the dry gas production modules 30, 32. The controller 46 and dry gas reservoir 48 remain affixed to the cabinet 12 when the mobile rack 28 is removed, as well as various electrical cables and pneumatic conduits interconnecting the modules 30, 32 with the controller 46 and gas reservoir 48 during operation of the dry gas production system 10. After rack 28 is moved into an operative position inside the cabinet 12, the requisite electrical cables and pneumatic conduits are connected to the modules 30, 32. Before the rack 28 is removed from the cabinet 12, these same electrical cables and pneumatic conduits are uncoupled and disconnected from the modules 30, 32.

The mobile rack 28 can be wheeled relative to floor 38 and cabinet 12 by pushing or pulling on the rack 28. It is to be appreciated that the surface which can be considered as the floor 38 should be broadly interpreted to include, for example, a ground surface. It is also to be appreciated that the rack 28 may be moved across other types of surfaces, such as a floor of a truck bed, which should also be considered to be floor 38. The rolling members 36 may incorporate additional optional features and structures, such as wheel locks and the like.

When the mobile rack 28 is parked by docking inside the cabinet 12, the mobile rack 28 becomes a constituent component of the cabinet 12 and the dry gas production modules 30, 32 located in respective operative locations within the cabinet 12. In the parked position, the rolling members 36 may interlock with detent features, in the form of notches 40, defined in the lower panel 14 of the cabinet 12, which limits or restrains movement of the rack 28 relative to the cabinet 12. Although the engagement between the rolling members 36 and notches 40 restricts movement of the rack 28 relative to the cabinet 12, the rolling members 36 may be disengaged from the notches 40 by application of a reasonably low manual force for removing rack 28 from cabinet 12.

The notches 40 are arranged about a central opening or cutout in a configuration with relative spacings such that each of the rolling members 36 is received in a corresponding one of the notches 40 for docking the rack 28 with the cabinet 12. The width of each notch 40 and the depth of each notch 40, which is determined by the thickness of the sheet metal constituting the lower panel 14, is selected such that the corresponding rolling member 36 received therein and confined between the notch edges is locked in position with a resistance force sufficient to resist inadvertent movement. Typically, the width of each notch 40 closely matches the effective width of the corresponding rolling member 36, which is determined, among other factors, by the outer diameter of the rolling member 36 and the thickness of lower panel 14. The invention contemplates that the lower panel 14 may be elevated above the floor 38 by, for example, feet (not shown) attached to the cabinet base, which would affect the width of the notches 40 as the plane of the lower panel 14 would be elevated above the floor 38 contacted by the rolling members 36.

Figure 2C:
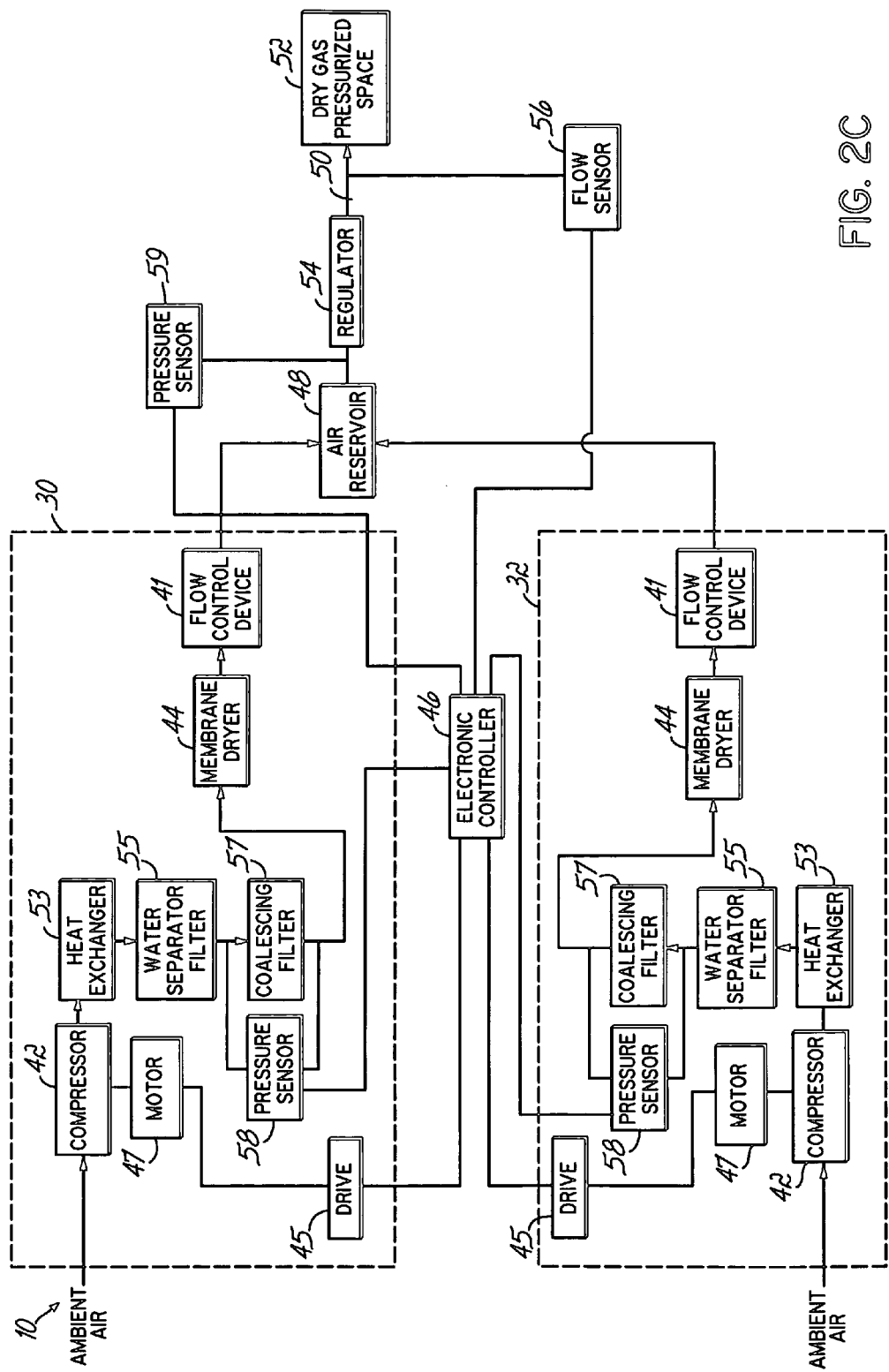
FIG. 2C is a diagrammatic pneumatic circuit representative of the dry gas production system of FIG. 2B.

With reference to FIGS. 2A-C, each of the dry gas production modules 30, 32 includes a compressor 42 and a membrane dryer 44 having an inlet pneumatically coupled with the compressor 42. An electronic controller 46, which is shared by the modules 30, 32, is electrically coupled with a motor 47 of the compressor 42 of each of the modules 30, 32. The electronic controller 46 may be a programmable logic controller ("PLC") or another microprocessor-based controller capable of executing software and carrying out the functions described herein, as will be understood by those of ordinary skill.

Disposed in the pneumatic circuit between the compressor 42 and the membrane dryer 44 are, in sequence, a heat exchanger 53, a water separator filter 55, and a coalescing filter 57, which cooperate to restrict the migration of liquids and aerosols to the membrane dryer 44. Ambient air pumped from the compressor 42 is exposed to the coalescing filter 57, which coalesces any aerosol or other liquid in the ambient air stream into small droplets. The heat exchanger 53 conditions the temperature of the ambient air, typically by reducing the temperature of the ambient air, so that the water separator filter 55 can more efficiently and effectively remove condensate from the ambient air.

Under the control of electronic controller 46, the pressurized dry gas discharged from an outlet of each membrane dryer 44 is directed to a gas reservoir 48, also positioned inside the cabinet 12 at a location above the modules 30, 32. The gas reservoir 48 stores a compressed volume of the pressurized dry gas. The gas reservoir 48 is pneumatically coupled by an outlet line 50 with a space 52, such as an underground conduit, a transmission line, or an aerial cable, that represents the recipient of the stream of dry gas. A regulator 54 is stationed in the outlet line 50, as well as a flow sensor 56 that continuously monitors the flow rate of dry gas through the outlet line 50.

The flow sensor 56 may be any conventional type of flow sensor capable of sensing or measuring fluid flow, generating an analog or digital signal indicating the sensed fluid flow, and communicating an indication of the flow rate as a digital or analog electrical signal to the electronic controller 46. For example, the flow sensor 56 may measure the flow of dry gas across an orifice in the outlet line 50 with which the flow sensor 56 is operationally coupled. The flow sensor 56 may communicate over a communication link, such as a wire, RF link, or IR link, with the electronic controller 46 either continuously or intermittently when interrogated by the electronic controller 46.

The motor 47 of each compressor 42, which may be oil free and sealed bearings, has a drive 45 controlled by the electronic controller 46. Each compressor 42 supplies a stream of ambient air at atmospheric pressure and ambient moisture content to the respective membrane dryer 44. Each membrane dryer 44 includes one or more membranes (not shown) operative for removing water molecules from the inflowing air, as well as other gaseous species including oxygen. Water vapor, in particular, efficiently permeates the porous membrane walls and is collected as a liquid for subsequent exhaust to the surrounding environment. As a result, the membrane dryer 44 depletes moisture from the arriving air such that the humidity level or moisture content of the dry gas stream exiting the membrane dryer 44 is significantly less than the ambient dew point.

The electronic controller 46, which is operative for controlling the compressor 42 of each module 30, 32, includes various alarm indicators (not shown) to warn a user of various conditions, such as an abnormal flow increase in the pressurized space 52 as detected by the flow sensor 56. Each of the alarm indicators may be any suitable light-emitting diode or lamp, or integrated into a digital display. The flow sensor 56, which is electrically coupled with the controller 46, is operative to provide high flow alarm functionality, during dry gas transfer, that indicates the presence of leaks in the pressurized space 52 and loss of dry gas through those leaks. Any downstream leak in the pressurized space 52 is efficiently and effectively detected with the assistance of the flow sensor 56. Generally, the pressurized space 52 may lose small volumes of dry gas without initiating a low flow alarm. However, the controller 46 monitors for the occurrence of abnormal leaks, such as a major breach of the pressurized space 52 that generates a perceptive and significant flow increase, that will necessitate human intervention. The response time of the flow sensor 56 is believed to be significantly faster than the response time of a conventional pressure sensor, which is typically used to detect these relatively large leaks in the pressurized space 52.

In order to maintain an appropriate pressure and flow across the membrane dryer 44, a flow control device 41 is installed in the output path of the membrane dryer 44. As the dry gas flow from the corresponding compressor 42 varies, therefore varying the input to the membrane of the membrane dryer 44, the flow control device 41 forces the membrane output flow to be directly proportional to the membrane backpressure, which helps maintain membrane performance.

The flow rate of ambient air to the membrane dryer 44 of each module 30, 32 is regulated by controlling the operation of the motor 47 of the corresponding compressor 42. Each compressor 42 does not need to operate continuously in order to effectively dehumidify the dry gas stream flowing to the pressurized space 52. To that end, the controller 46 uses analog pressure indications received from a pressure sensor 58 in the outlet line 50 to control the on/off duty cycle of the operation of compressor 42 according to the measured system pressure for maintaining a targeted system pressure. The pressure sensor 58 may optionally tap the atmosphere within the gas reservoir 48 instead of the outlet line 50. The pressure sensor 58 communicates pressure indications to the electronic controller 46 over a communication link, such as a wire, RF link, or IR link.

The pressure sensor 58 may each be any conventional type of pressure sensing device capable of sensing or measuring fluid pressure, generating an analog or digital signal indicating the sensed fluid pressure, and communicating an indication of the fluid pressure as a digital or analog electrical signal to the electronic controller 46. Pressure sensor 58 may be configured to measure either total pressure or static pressure, and may be any one of numerous pressure sensing devices known in the art including, but not limited to, a capacitance sensor, a strain gauge sensor, a piezoresistive sensor, and a thermal sensor.

The gas flow demand is monitored by continuously or intermittently sensing the pressure level with pressure sensor 58 in either the outlet line 50 or the gas reservoir 48 or continuously or intermittently sensing the flow rate with flow sensor 56. The derived flow demand is then used to start and stop the motor drives of the compressors 42. Specifically, the controller 46 starts and stops the compressor 42 of each individual module 30, 32 to respond to a varying flow demand. One of the compressors 42 is turned off (i.e., the power is discontinued to the corresponding motor drive) once the flow demand rises above a preset upper level and one of the compressors is turned on (i.e., the corresponding idle motor drive is powered) if the flow demand is less than a preset lower level. If the flow demand dictates that only a single compressor be in operation, each of the single compressor modules 30, 32 is operated sequentially in a redundant stand-by operational mode to prevent uneven wear.

A differential pressure sensor 59 may be used to monitor the fluid pressure by communicating with the pneumatic circuit at separate locations upstream and downstream from the coalescing filter 57. The differential pressure sensor 59 provides an indication of the measured fluid pressure to the controller 46. The differential pressure sensor 59 communicates pressure indications to the electronic controller 46 over a communication link, such as a wire, RF link, or IR link. The controller 46 may use the downstream and upstream pressure indications received from the differential pressure sensor 59 to determine a pressure drop across the coalescing filter 57 from the pressure differential. The pressure drop arises from the flow restriction represented by the filter element (not shown) inside coalescing filter 57 and increases as the filter element ages. If the pressure drop reaches a set upper level, this may indicate that filter service is due. The controller 46 may respond to a pressure drop equaling or exceeding the set upper level by issuing a warning to an operator that the filter element in coalescing filter 57 should be changed.

The differential pressure sensor 59 may each be any conventional type of differential pressure sensing device capable of sensing or measuring fluid pressure, generating an analog or digital signal responsive to the measured fluid pressure difference, and communicating an indication of the fluid pressure difference as a digital or analog electrical signal to the electronic controller 46. Differential pressure sensor 59 may be configured to measure either total pressure or static pressure, and may be any one of numerous differential pressure sensing devices known to a person having ordinary skill in the art. In a typical differential pressure sensor, two diaphragms are each exposed to one of two fluid pressures that are to be compared and a transducer responds to the difference between the two pressures of the process fluid by producing electrical output signals for indication or control. Differential pressure sensor 59 may include electronic circuitry to process the transducer signal before communicating the processed signal to the controller 46.

The controller 46 may include a USB port for outputting status strings to USB compatible devices (printers, etc). The controller 46 may also include an ISP/Dial Up port to provide the ability to generate alarm status indications to remote monitored locations, as well as a real time status display and event log.

With specific reference to FIG. 2C, the drying or pneumatic circuit of the dry gas production system 10 includes the pneumatic components of the modules 30, 32. The pneumatic circuit may include a conventional dry air feedback loop as understood by persons of ordinary skill in the art. Quick-connect air and electrical inputs and outputs may be incorporated into the modules 30, 32, controller 46, and gas reservoir 48 to permit fast (no tool) exchange of the major components.

As mentioned above, utilizing pressure and/or flow monitoring downstream of the compressors 42 of the modules 30, 32, multiple compressors 42 may be controlled by the controller 46 to maintain a pressure range or set point or match a gas flow demand to the space 52. The compressors 42 of the modules 30, 32 may be commanded by the controller 46 to run alternately to maintain the desired condition, e.g., pressure or flow, for the dry gas stream flowing in the outlet line 50. Alternatively, the compressors 42 may be commanded by the controller 46 to run simultaneously if only one of the modules 30, 32 is not able to satisfy the dry gas demand of the space 52. The controller 46 may have logic capability to derive the most economical and reliable combination of compressor quantity and drive frequency required to vary output flow to match the variable dry gas demand.

Normally, the drive 45 for the compressor motor 47 will have a fixed power supply system with constant speed drive circuitry that delivers three phase electrical energy of constant frequency, such that the compressor 42 operates at a constant speed. However, the compressor 42 of one or both of the modules 30, 32 may be optionally supplied a variable frequency drive 45 to increase or decrease output flows to match demand. The variable frequency drive 45 includes variable speed drive circuitry that supplies three phase power or single phase power at a variable frequency to the motor 47. The variable frequency drive 45 allows the motor 47 to be operated at a variable speed in direct proportion to the variable frequency of the drive 45.

The invention contemplates that dry gas production system 10 may include additional dry gas production modules similar or identical to modules 30, 32 that are controlled by the controller 46. In addition, the invention contemplates that additional dry gas production systems 10 may be coupled with the pressurized space 52 at various different locations. In this situation, all of the individual systems 10 are controlled by a single master controller 46 to ensure that the dry gas demand is appropriately satisfied in view of a measured variable, such as pressure or flow. This master controller 46 would send a signal to the motor drive 45 of the individual compressors 42 in each of the dry gas production systems 10 to regulate compressor operation and, thereby, the output of dry gas supplied from each set of modules 30, 32 to the pressurized space 52.

With reference to FIGS. 1A and 2A, the frame 34 of the mobile rack 28 includes two pairs of parallel and horizontal arms or beams 60a,b and 62a,b spaced vertically from each other. The beams 60a,b and 62a,b, which may be tubular, are braced and supported by other connecting beams in the frame 34. Dry gas production module 30 is received and supported by beams 60a,b and dry gas production module 32 is received and supported by beams 62a,b. As illustrated in FIG. 2A, each of the modules 30, 32 drops directly into the open frame arrangement of frame 34. Beams 60a,b are spaced vertically from beams 62a,b such that the lower module 32 can be dropped into position inside the frame 34. Each of the tubular beams 60a,b and 62a,b includes a plurality of, for example, at least two registration sockets or openings 64, 66 that open into a hollow interior 63. Each of the modules 30, 32 includes a trough-shaped support platform 68 having contoured side panels 70, 72 between which the compressor 42 is situated.

Figure 2D:
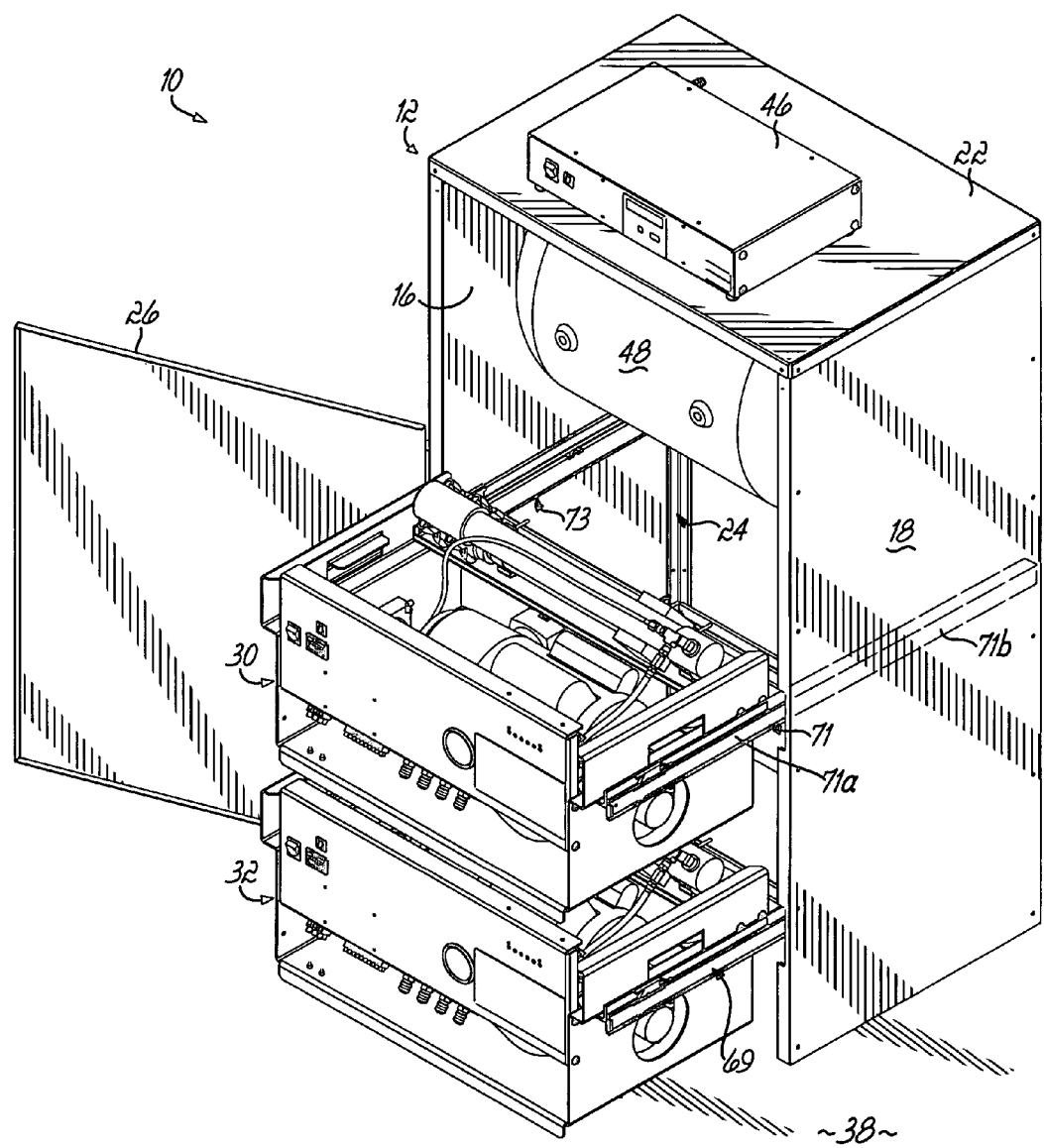
FIG. 2D is an assembled perspective view similar to FIG. 2B in accordance with an alternative embodiment of the present invention in which the dry gas production modules are mounted on drawer slides in the cabinet and the electrical cables and pneumatic conduits are omitted for clarity.

With reference to FIG. 2D, the dry gas production module 30 may be mounted to the cabinet 12 using a pair of drawer slides 71, 73 that flank the module 30. Drawer slide 71 has a rail 71a mounted to the chassis of module 30, a rail 71b mounted to one or more beams of frame 24, and a bearing (not shown) mounting the module rail 71a to the frame rail 71b for longitudinal reciprocal movement of the module rail 71a relative to the frame rail 71b. The drawer slide 71 may include additional components, such as a stop to limit the range of outward movement of the module rail 71a relative to the frame rail 71b and a retention and release mechanism that permits relative movement between the module rail 71a and the frame rail 71b. The second drawer slide 73 may be identical in construction to drawer slide 71. The drawer slides 71, 73 may have any conventional type of construction recognized by a person having ordinary skill in the art. The drawer slides 71, 73 collectively define a module support that permits the dry gas production module 30 to be removed by longitudinal reciprocal movement from its operating position inside the cabinet 12 to a serviceable position at least partially outside of the cabinet 12 without the service technician having to physically lift or bear the full weight of the module 30. Dry gas production module 32 may have a pair of drawer slides, of which only drawer slide 69 is visible in FIG. 2D, that are similar or identical in construction to drawer slides 71, 73 and that provide a similar advantage.

With reference to FIGS. 3A and 3B, side panel 70 of dry gas production module 30 includes laterally bent portion 75 that provides a platform for a plurality of at least two registration pins 74, of which one registration pin 74 is shown. The bent portion 75 supplies an open space dimensioned to receive beam 60a, which underlies the bent portion 75 when the module 30 is mounted to the mobile rack 28. The registration pins 74 are attached or otherwise affixed to the side panel 70 at positions that overlie the corresponding registration openings 64, 66 in beam 60a. The registration pins 74 project downwardly in normal use and have a separation along the length of beam 60a commensurate with the distance between the registration openings 64, 66 in beam 60a. Side panel 72 of dry gas production module 32 has an identical set of registration pins (not shown) spaced in a similar manner for engaging registration openings 64, 66 (FIG. 2B) in beam 60b. When module 30 is lowered into position in the mobile rack 28, as depicted in FIG. 2A, the registration pins 74 on both side panels 70, 72 engage the registration openings 64, 66 in the corresponding beams 60a,b and penetrate through the registration openings 64, 66 into the hollow interior 63 enclosed by the tubular sidewall of beams 60a,b.

Contact between the registration pins 74 and the material of the beams 60a,b surrounding the registration openings 64, 66 limits motion (i.e., translation and rotation) of the module 30 relative to the beams 60a,b in the horizontal plane. However, the module 30 may be installed and removed by a vertical or lifting movement in a direction normal to the horizontal plane to disengage the registration pins 74 from the registration openings 64, 66. The force required to remove the module 30 is approximately equal to the weight of the module 30 because no positive resistance, other than weight, is provided against vertical movement by lifting. The passive nature of the engagement between registration pins 74 and registration openings 64, 66 provides a mechanically simple technique for coupling the modules 30, 32 with the mobile rack 28.

The engagement between the registration pins 74 and registration openings 64, 66 also ensures reproducibility in the positioning of the modules 30, 32 each time the modules 30, 32 are installed in mobile rack 28, which may be important in establishing electrical and pneumatic connections. The registration also ensures that the mounted modules 30, 32 do not contact the cabinet 12 when the rack 28 is parked inside.

The mass of the dry gas production module 30 provides a resistance against vertical movement and keeps the registration pins 74 engaged with the registration openings 64, 66 under normal conditions. A small clearance is provided between each registration pin 74 and the corresponding one of the registration openings 64, 66. The beams 60a,b of the frame 34 support the weight of the module 32. Side panels 70, 72 of module 32 couple with beams 62a,b in the same manner as side panels 70, 72 of module 30 couples with beams 60a,b.

A vibration isolator in the form of an elastomeric strip 76 may be utilized between the side panel 70 and the beam 60a to cushion and dampen vibration originating from the dry gas production module 30. A similar elastomeric strip (not shown) is compressed between side panel 72 and beam 60b, as well as between the side panels 70, 72 of module 32 and beams 62a,b. Strip 76 includes an opening registered with the registration opening 64 in beam 60a and through which the registration pin 74 extends. The type of elastomeric material and its durometer, and the dimensions, including thickness, of the elastomeric strip 76 are selected to provide the desired level of vibration dampening. The length of the registration pins 74 is chosen to accommodate the thickness of the elastomeric strip 76.

With reference to FIG. 4 and in accordance with an alternative embodiment, another type of vibration isolator constituted by an elastomer bladder 78 formed of a tubular member of fluid-impervious material may be disposed between the side panel 70 and the beam 60a. Elastomer bladder 78 is tubular and includes a fluid cavity or reservoir 80 surrounded by a tubular sidewall 91 that may be inflated with a fluid or gas to provide cushioning for the module 30. When fluid is absent from the reservoir 80, the bladder 78 is deflated so that, for example, the mobile rack 28 may be moved with the module 30 in a stable condition unlikely to damage the bladder 78. Optionally, the source of the gas inflating the reservoir 80 may comprise a small portion of the dry gas from one or both of the modules 30, 32, as shown in FIG. 4. In this operative situation, the pressurized fluid inside the reservoir 80 may be drained to a vent when the modules 30, 32 are not operating and supplied to the reservoir only when the dry gas production system 10 is operating.

Such bladder-type vibration isolators like bladder 78 would provide vibration isolation and yet relax, when deflated, to secure the module 30 during installation and maintenance procedures, in a manner similar to conventional self-leveling suspensions. The bladder 78 supports the load represented by the module 30 and dampens vibrations generated during the operation of the compressor 42. A similar bladder 78 may be supplied between beam 60b and module 30, and between module 32 and each of the beams 62a,b.

Figure 5:
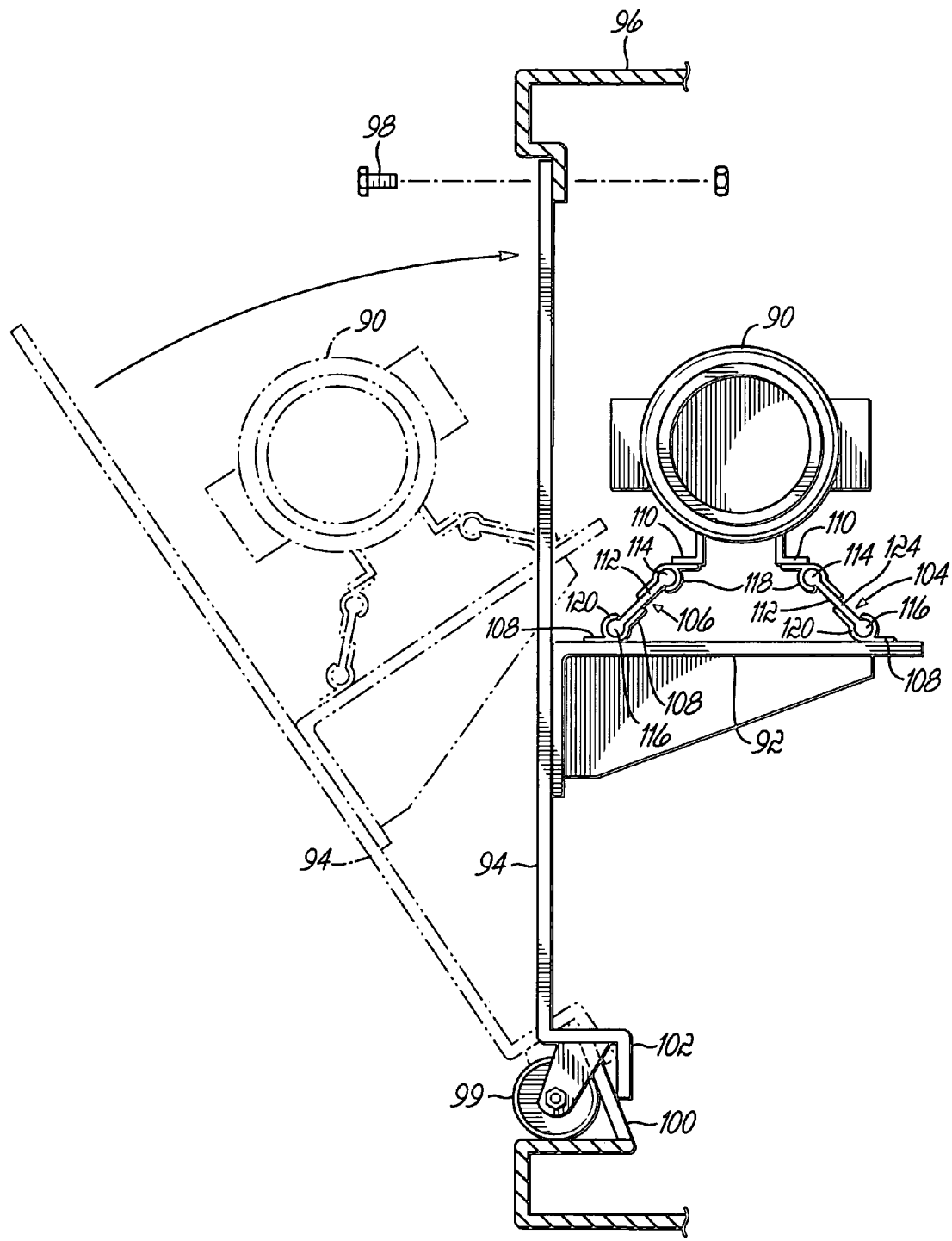
FIG. 5 is a side view in partial cross-section of a mobile cart and compressor mounts for a compressor carried by the mobile cart in accordance with an alternative embodiment of the invention.

With reference to FIG. 5 and in an alternative embodiment of the present invention, a compressor 90 for a dry gas production system (not shown) may be mounted to a shelf 92 projecting from a mobile rack 94. When the mobile rack 94 is mounted to a compatible cabinet 96, the shelf 92 and compressor 90 supported on the shelf 92 are positioned inside the enclosure defined by the cabinet 96. When the mobile rack 94 is docked with the cabinet 96, conventional fasteners 98 are used to secure the mobile rack 94 with the cabinet 96. The mobile rack 94 and shelf 92 become constituent components of the cabinet 96 when secured thereto. The application contemplates that a dry gas module (not shown) similar to dry gas modules 30, 32 (FIG. 2A, may be mounted to the shelf 92.

The mobile rack 94 is equipped with a plurality of, for example, two rolling members 99, such as casters, wheels, or rollers and of which only one rolling member 99 is visible in FIG. 5, that contact the floor at various support locations. The rack 94 may be wheeled to various locations with the compressor 90 mounted to the shelf 92 in a manner similar to mobile rack 28 (FIG. 1A). The cabinet 96 includes a cusped lip 100 near to the floor and extending across the width of the opening to the cabinet 96 that receives the rack 94. The rack 94 includes a corresponding flange 102 that engages the cusped lip 100 to assist in docking the mobile rack 94 with the cabinet 96.

The compressor 90 is supported horizontally on the shelf 92 by a pair of identical compressor mounts 104, 106. Each of the compressor mounts 104, 106 includes a rigid member 108 mounted to the shelf 92, a rigid member 110 mounted to the compressor frame, and an elastomeric member 112 coupled at opposite edges by beads 114, 116 with a corresponding pair of C-shaped slots 118, 120 formed in mounts 104, 106, respectively. A web 124 extends between the beads 114, 116 and supplies the vibration isolation for the compressor 90 during operation.

Figure 6A:
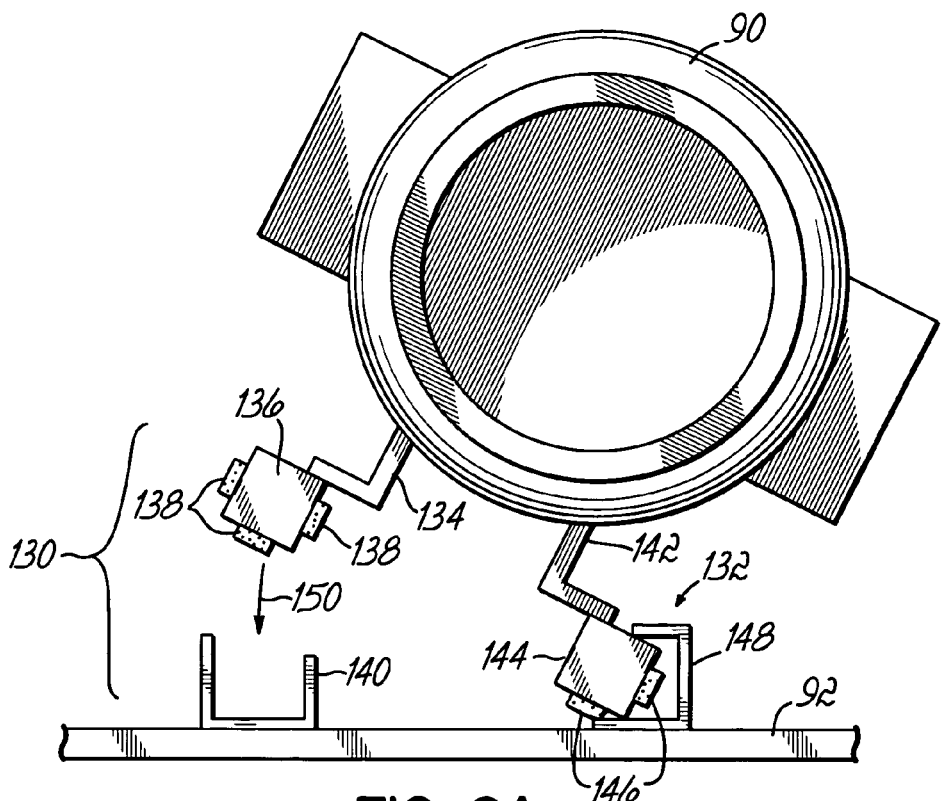
FIGS. 6A and B are side views of a compressor mounted to a shelf with compressor mounts in accordance with an alternative embodiment of the invention.
Figure 6B:
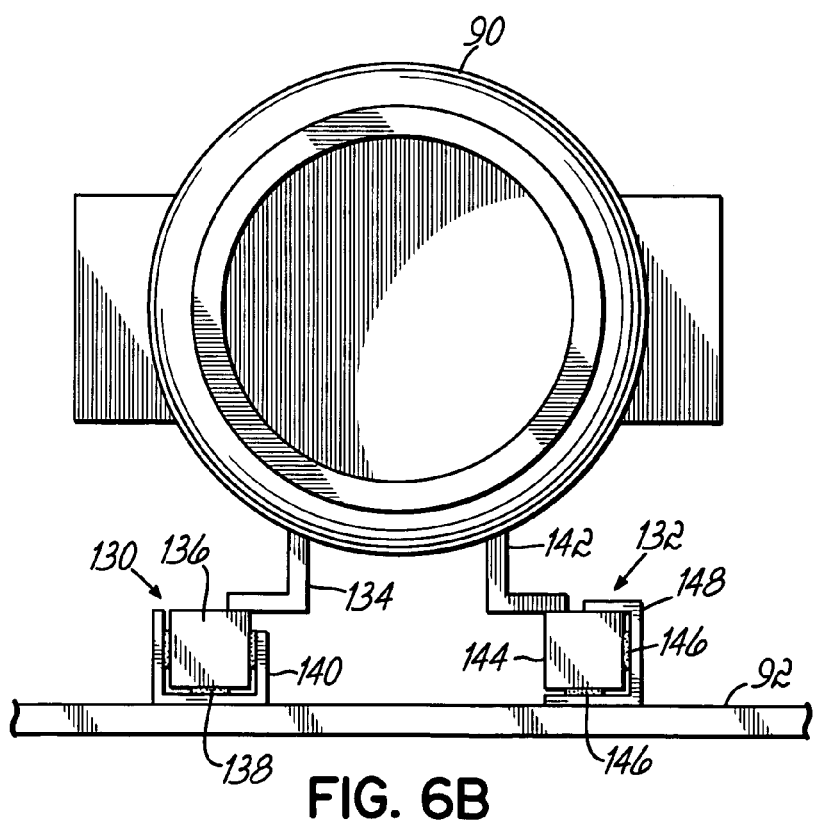

With reference to FIGS. 6A,B in which like reference numerals refer to like features in FIG. 5 and in accordance with an alternative embodiment of the invention, the compressor 90 may be mounted to shelf 92 using two compressor mounts indicated generally by reference numerals 130, 132 (FIG. 6B). Compressor mount 130 includes an angled foot 134 mounted to the underside of the compressor 90 and a mounting member in the form of a rectangular rail or bar 136 mounted to the angled foot 134. Attached to three sides of the rectangular bar 136 are elastomeric strips 138. The rectangular bar 136 and strips 138 are dimensioned to be inserted into a U-shaped channel member 140 that is mounted to the shelf 92. When the rectangular bar 136 is installed in channel member 140, the strips 138 contact the channel member 140 in an intervening manner and, thereby, supply vibration isolation.

Compressor mount 132 includes an angled foot 142 mounted to the underside of the compressor 90 and a mounting member in the form of a rectangular rail or bar 144 mounted to the angled foot 142. Attached to two sides of the rectangular bar 144 are elastomeric strips 146. The rectangular bar 144 and strips 146 are dimensioned to be inserted into a U-shaped channel member 148 that is mounted to the shelf 92. When the rectangular bar 144 is installed in channel member 148, the strips 146 contact the channel member 148 in an intervening manner and, thereby, supply vibration isolation.

Rectangular bar 136 is offset from the midline of the angled foot 134 and projects beyond the side edge of foot 134. Similarly, rectangular bar 144 is offset from the midline of the angled foot 142 and projects beyond the respective side edge of foot 142. These offsets permit the rectangular bars 136, 144 to be easily engaged with the channel members 140, 148.

The U-shaped channel members 140, 148 are aligned parallel with each other when attached to the shelf 92. However, the open side of the U-shaped channel of channel member 140 is oriented differently from the open side of the U-shaped channel of channel member 148. More specifically, the open side of channel member 140 is oriented vertically and the open side of channel member 148 is oriented horizontally.

In use, the compressor 90 is tilted and lowered as shown in FIG. 6A such that the rectangular bar 144 laterally enters the channel of channel member 148. The rectangular bar 144 fits beneath the upper arm of the channel of channel member 148, which is shortened in length relative to the opposite lower arm to assist in inserting the bar 144. After the bar 144 is partially engaged with the channel in channel member 148, the compressor 90 is rotated and lowered as indicated generally by arrow 150, to provide the mounted condition shown in FIG. 6B. In the mounted condition, the elastomeric strips 138, 146 supply vibration isolation between the compressor 90 and the cabinet 96 to which shelf 92 is attached and the rectangular bars 136, 144 have a non-contacting relationship with the respective channel members 140, 148.

Figure 7:
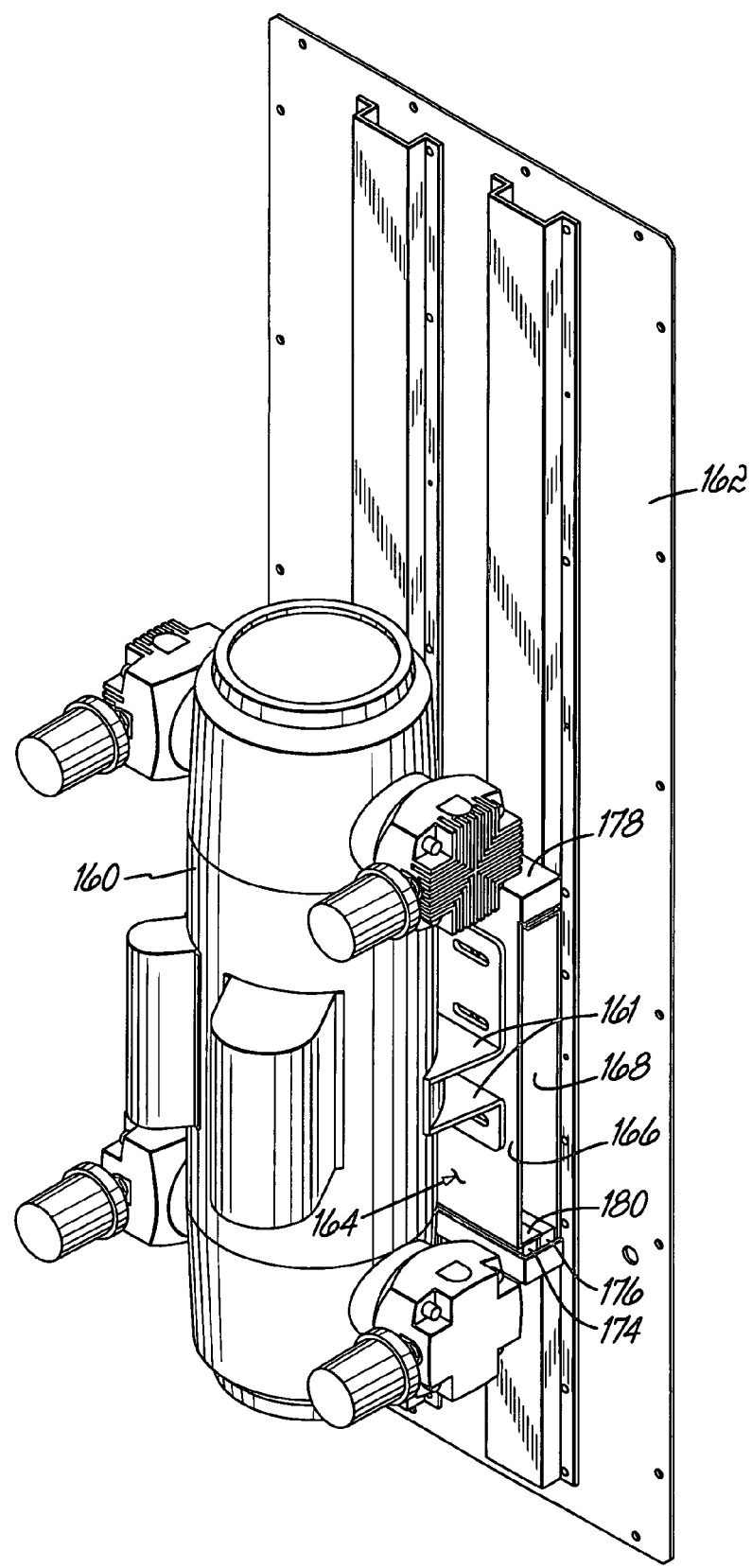
FIG. 7 is perspective view of a compressor mount for mounting a compressor vertically to a support plate in accordance with an alternative embodiment of the invention.
Figure 8:
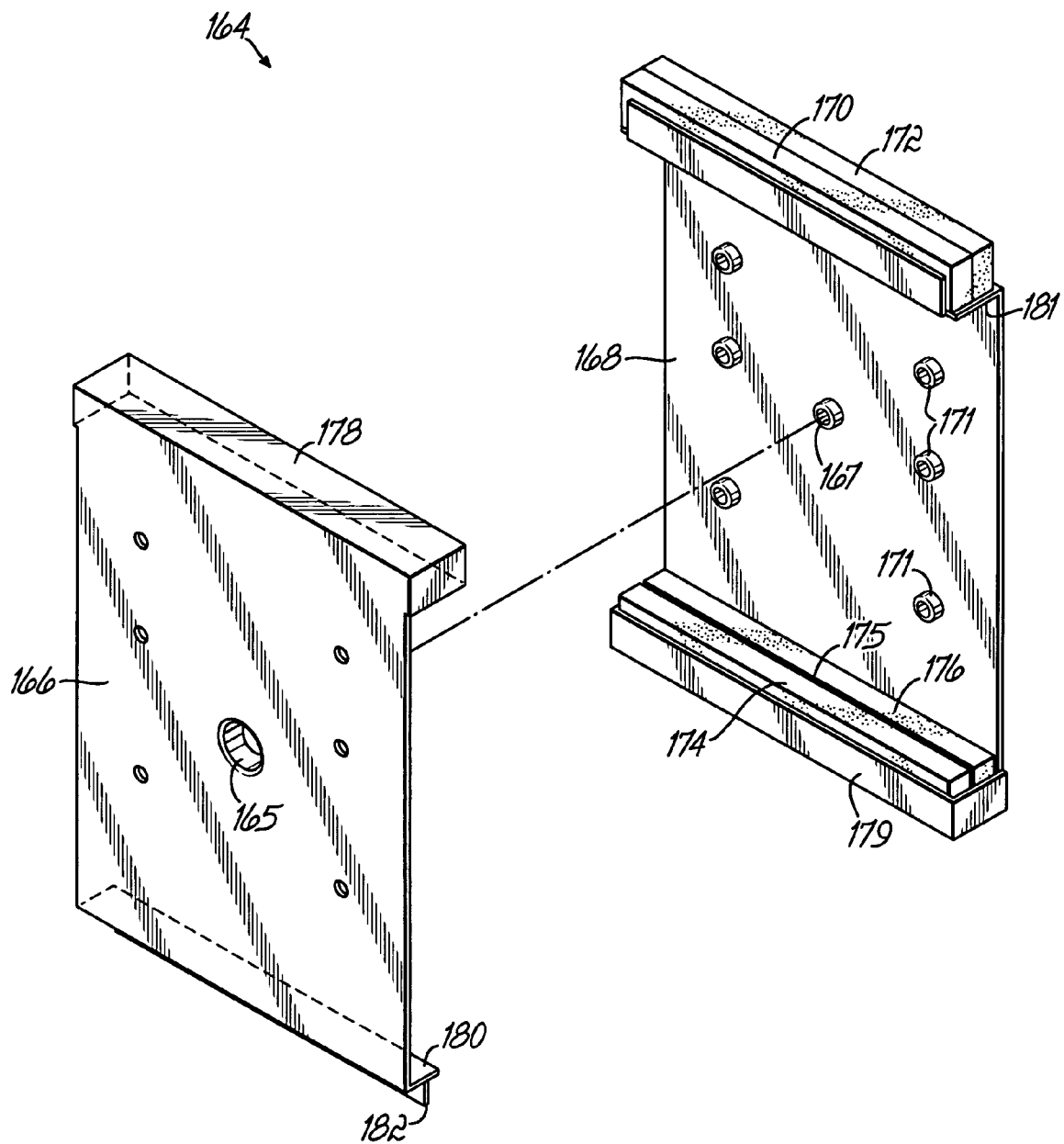
FIG. 8 is a disassembled view of the compressor mount of FIG. 7.
Figure 9A:
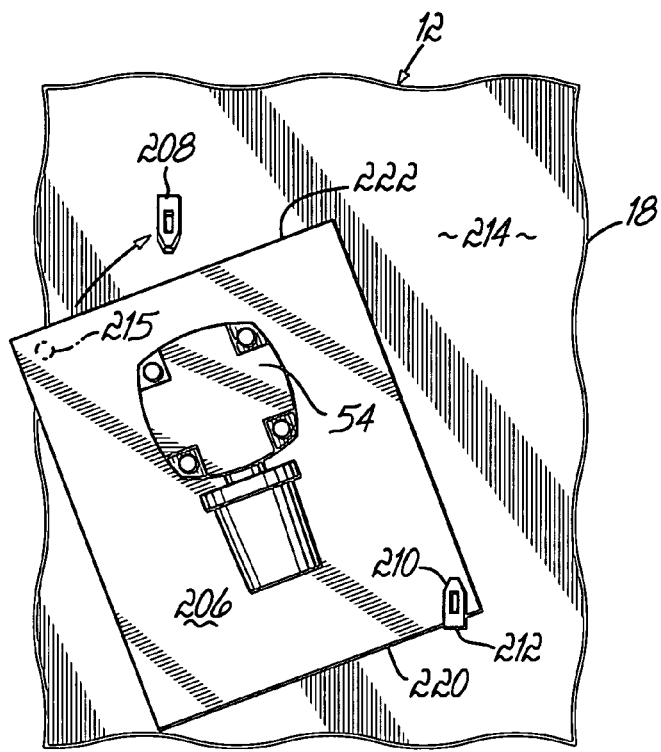
FIGS. 9A and B are views of a mounting arrangement for coupling a component with the cabinet of a dry gas production system.
Figure 9C:
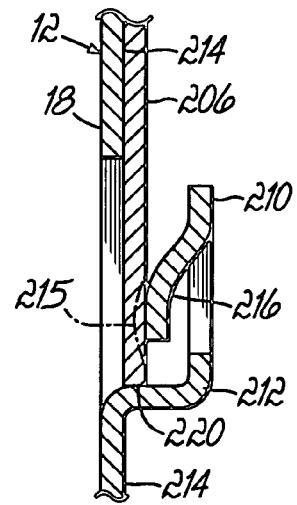
FIG. 9C is a detailed cross-sectional view taken generally along line 9C-9C of FIG. 9B.
Figure 9B:
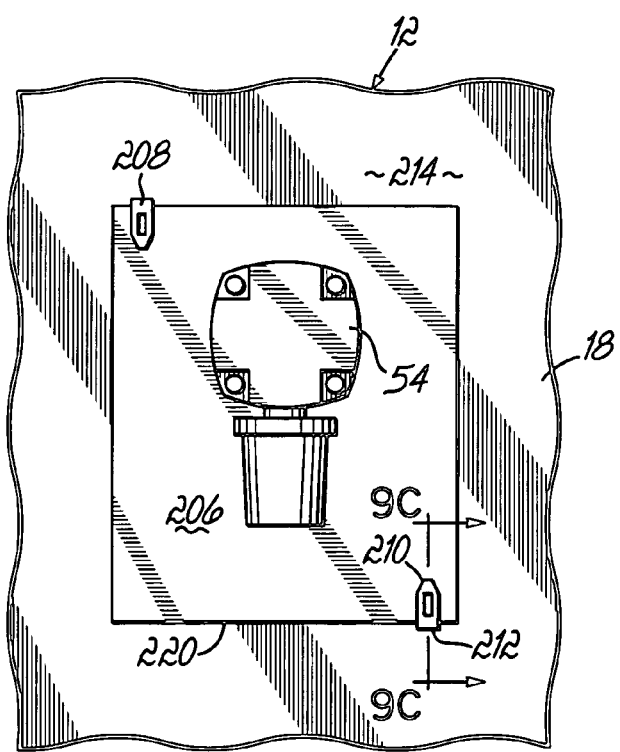

With reference to FIGS. 7 and 8 and in accordance with an alternative embodiment of the invention, a compressor 160 is mounted to a panel 162 of a cabinet (not shown) by a compressor mount assembly 164. The compressor mount assembly 164 includes a first plate 166 that contacts the compressor 160 and a second plate 168 that contacts the panel 162. The plates 166, 168 may be assembled together using a conventional fastener (not shown) extending through a registered pair of openings 165, 167, respectively, to define an assembly. The assembly is mounted to the panel 162 using conventional fasteners (not shown) that are threaded through slots in mounting flanges 161, of which two mounting flanges 161 are visible in FIG. 7, on the compressor 160 and registered pairs of openings 169, 171 in the plates 166, 168, respectively, are secured to the panel 162.

In the assembled state, the plates 166, 168 of assembly 164 are separated by a plurality of elastomeric bars 170, 172 near one edge and by another plurality of elastomeric bars 174, 176 near the opposite edge. When the plates 166, 168 are coupled together and oriented for mounting the compressor 160 to the panel 162, bars 170, 172 and bars 174, 176 are near the top and bottom edges of the compressor mount assembly 164. The bars 170, 172, 174, 176, which are mounted to plate 168, provide vibration isolation between the compressor 160 and panel 162 so that vibrations generated by the operation of the compressor 160 are dampened and at least a portion of these vibrations are not transferred to the panel 162. Preferably, only a minor component of the vibration is transferred because the bars 170, 172, 174, 176 of assembly 164 dampen a significant component of the vibration.

Plate 168 includes a shaped portion defining a rectangular cavity 179 at one end and an L-shaped flange 181 at an opposite end from cavity 179. Bars 174, 176 are positioned partially inside of cavity 179, with a substantial portion of each bar 174, 176 protruding from the cavity 179. A portion of each of the bars 174, 176 projects beyond the terminating end of flange 181. Plate 166 includes a rectangular cavity 178 at one end and a T-shaped flange 180 at an opposite end from cavity 178. An arm or tongue 182 projects outwardly from the flange 180 at approximately 90° to a base portion of flange 180. In the assembly 164, the cavity 178 is dimensioned to fit over the projection portion of bars 170, 172 and the tongue 182 is inserted into a narrow gap 175 separating bars 174, 176. The opening to cavity 178 in plate 166 faces the opening to cavity 179 in plate 168.

The bars 170, 172, 174, 176 separate the assembled plates 166, 168 so that the plates 166, 168 have a non-contacting relationship. Instead, one side surface of each of the bars 170, 172, 174, 176 contacts plate 166 and an opposite side surface of each of the bars 170, 172, 174, 176 contacts plate 168. As a consequence, vibrations generated by the operation of the compressor 160 are dampened by the bars 170, 172, 174, 176 and reduced in amplitude when transferred between the plates 166, 168, instead of being directly transferred with full amplitude between the plates 166, 168.

The plate assembly is mounted to the panel 162 such that the bars 170, 172, 174, 176 are primarily in compression under the weight of the compressor 160. To avert a significant shear force, the assembled plates 166, 168 are oriented, when mounted to the cabinet 96, such that bars 170, 172 are compressed between a contacting surface of plate 166 surrounding cavity 178, and a contacting surface of flange 181 on plate 168 and bars 174, 176 are compressed between a contacting surface of plate 168 surrounding cavity 179 and a contacting surface of flange 180 on plate 166. Bar 174 contacts the surface of flange 180 and bar 176 contacts the surface of flange 180 on opposite sides of tongue 182.

With reference to FIGS. 2B and 9A-C and in accordance with another aspect of the invention, a mounting arrangement for coupling a component, such as the in-line regulator 54, with a panel of a cabinet, such as side panel 18 of cabinet 12 is shown. The mounting arrangement includes a mounting plate 206 to which the regulator 54 is attached or otherwise mounted. The mounting plate 206 is captured by a pair of substantially identical securing members 208, 210 to the side panel 18. The mounting plate 206 and securing members 208, 210 collectively constitute the mounting arrangement.

Each of the securing members 208, 210 includes an L-shaped arm 212 that projects from an interior surface 214 of the side panel 18 by a distance exceeding the thickness of the mounting plate 206 such that the mounting plate 206 can be freely inserted between the arm 212 and the interior surface 214. Projecting toward the interior surface 214 of the arm 212 is a finger 216 that has a resilient cantilevered attachment at one end with the arm 212. The finger 216 is spaced from the interior surface 214 by a distance smaller than the thickness of mounting plate 206 such that contact between the finger 216 and the side panel 18 displaces the finger 216 away from side panel 18. This displacement away from side panel 18 causes the finger 216 to apply a resilient bias force against the mounting plate 206 that is sufficient, when the finger 216 of each securing member 208, 210 is acting on mounting plate 206, to secure the mounting plate 206 and attached regulator 54 to the side panel 18. Optional concavities 215, of which one concavity 215 is visible in FIGS. 9A and 9C, may be provided at locations on the mounting plate 206 that eventually are engaged with the fingers 216 of the securing members 208, 210. The concavities 215 may be shallow recesses or, alternatively, may be open-ended bores extending through the entire thickness of the mounting plate 206.

A sheet metal process is used to modify the thin sheet metal of the side panel 18 and thereby form the finger 216 of each securing member 208, 210. A second sheet metal process is then used to form the arm 212 of each securing member 208, 210.

In use, the regulator 54 is attached to the mounting plate 206. The mounting plate 206 is then moved such that a portion of a side edge 220 of mounting plate 206 is positioned between the finger 216 of securing member 210 and the side panel 18. The mounting plate 206 is then rotated such that an opposite side edge 222 is positioned between the fingers 216 of securing member 208. The fingers 216 of securing members 208, 210 apply a bias force that secures the mounting plate 206 and attached regulator 54 to the side panel 18. As a result, the mounting plate 206 and the regulator 54 carried by the mounting plate 206 are secured to the side panel 18 without the assistance of conventional fasteners, such as threaded screws or bolts. This eliminates the need for such conventional fasteners and simplifies installation and removal.

Figure 10:
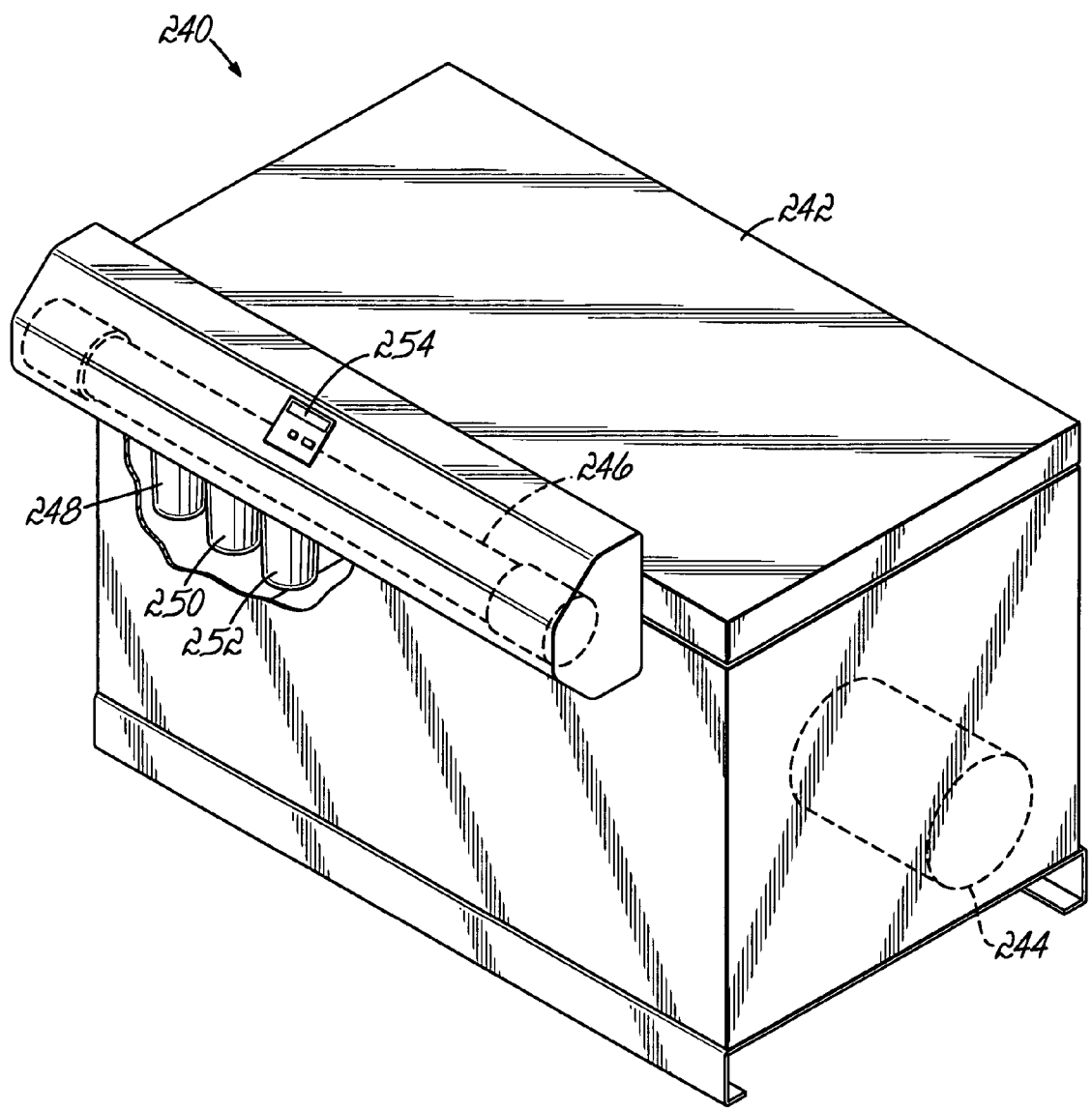
FIG. 10 is a perspective view of a dry gas production system in accordance with an alternative embodiment of the invention.

With reference to FIG. 10 and in accordance with another aspect of the invention, a dry gas production system 240 is shown that includes an enclosure or cabinet 242 housing a compressor 244, a membrane dryer 246, a set of particulate and coalescing filters 248, 250, 252, and an electronic controller 254 that controls operation of the compressor 244. The compressor 244 is a rotary screw compressor and the controller 254 incorporates a variable frequency drive, which is described in detail above, that powers the motor of the compressor 244 and has the ability to vary the speed of the compressor motor. The preceding description applies to the variable speed implemented in controller 254.

The rotary screw compressor 244, which is a type of positive displacement compressor, implements a plurality of intermeshing rotors (not shown) that each include helical lobes to produce compression when the rotors are rotated. A fluid, such as air, drawn into the rotary screw compressor 244 is trapped between the rotors and compressed to a designated discharge pressure.

While the present invention has been illustrated by a description of various preferred embodiments and while these embodiments have been described in considerable detail in order to describe the best mode of practicing the invention, it is not the intention of the applicants to restrict or in any way limit the scope of the appended claims to such detail. Additional advantages and modifications within the spirit and scope of the invention will readily appear to those skilled in the art. The invention itself should only be defined by the appended claims, wherein we claim:

The invention claimed is:

1. A dry gas production system comprising:
   an enclosure with an access opening, said enclosure disposed upon a surface;
   at least one dry gas production module that includes a compressor and a membrane dryer pneumatically coupled with said compressor; and
   a mobile rack with a plurality of rolling members, said mobile rack configured to support said at least one dry gas production module, said mobile rack being movable on said rolling members relative to said surface and relative to said enclosure for moving said at least one dry gas production module through said access opening between a first position inside the enclosure and a second position outside of the enclosure, said rolling members supporting said mobile rack for movement through said access opening.

2. The dry gas production system of claim 1 wherein said mobile rack includes a pair of parallel arms supporting said dry gas production module, each of said arms including at least one pin opening, and said at least one dry gas production module includes at least one outwardly-projecting pin that engages said at least one pin opening when said at least one dry gas production module is supported by said mobile rack.

3. The dry gas production system of claim 2 further comprising:
   a vibration isolator between one of said arms and said at least one dry gas production module, said vibration isolator including an elastomeric bladder with an internal reservoir pneumatically coupled with said compressor, and said internal reservoir of said elastomeric bladder being inflated by gas supplied from said compressor.

4. The dry gas production system of claim 1 wherein said enclosure includes a plurality of detents each adapted to engage one of said rolling members when said mobile rack is positioned in the first position inside said enclosure.

5. The dry gas production system of claim 1 wherein said enclosure includes a flange positioned proximate to said access opening, and said mobile rack includes a flange positioned proximate to said rolling members, said flange of said mobile rack configured to engage said flange of said enclosure when said mobile rack is parked inside said enclosure in the first position and said rolling members being supported on said flange of said enclosure.

6. The dry gas production system of claim 1 further comprising:
   a compressor mount coupling said compressor with said enclosure, said compressor mount including a first rigid mounting member attached to said compressor and having a C-shaped slot, a second rigid mounting member attached to said enclosure and having a C-shaped slot, and an elastomeric web having a first bead engaged with said C-shaped slot of said first rigid mounting member, a second bead engaged with said C-shaped slot of said second rigid mounting member, and a web interconnecting the beads.

7. The dry gas production system of claim 1 further comprising:
   a compressor mount including first and second channel members each mounted to said enclosure and first and second mounting members each attached to said compressor, said first and second channel members each having an elongate U-shaped channel, and said first and second mounting members each having a rail positioned in said U-shaped channel of one of said first and second channel members.

8. The dry gas production system of claim 7 wherein said compressor mount further comprise:
   a first vibration isolator between said U-shaped channel of said first channel member and said first mounting member; and
   a second vibration isolator between said U-shaped channel of said second channel member and said second mounting member, said first and second vibration isolators each comprising a plurality of elastomeric strips cooperating to limit vibration transfer from said compressor to said enclosure.

9. The dry gas production system of claim 7 wherein said U-shaped channel of said first channel member has a first open side and said U-shaped channel of said second channel member has a second open side, said first U-shaped channel oriented relative to said second U-shaped channel such that said first and second open sides open in different directions.

10. The dry gas production system of claim 1 further comprising:
    a compressor mount coupling said compressor with said enclosure, said compressor mount including a first mounting member and a second mounting member, said first mounting member being coupled with said second mounting member to form an assembly having a first end and a second end opposite said first end;
    a first vibration isolator disposed between said first and second mounting members at said first end; and
    a second vibration isolator disposed between said first and second mounting members at said second end.

11. The dry gas production system of claim 10 wherein said first and second vibration isolators each comprise a plurality of elastomeric strips, said strips operating to separate said first mounting member from said second mounting member to provide a non-contacting relationship between said first and second mounting members.

12. The dry gas production system of claim 10 wherein said assembly is oriented, when supporting said compressor from said enclosure, such that said first and second mounting members transfer a vertical compressive load to said first and second vibration isolators.

13. The dry gas production system of claim 1 wherein said at least one dry gas production module further comprises a filter and a differential pressure sensor, said differential pressure sensor is configured to sense a first fluid pressure upstream of said filter, to sense a second fluid pressure downstream of said filter, and to produce an output signal representative of the first and second fluid pressures.

14. The dry gas production system of claim 13 further comprising:
    an electronic controller electrically coupled with said differential pressure sensor, said electronic controller configured to determine a pressure drop condition of said filter based upon said output signal.

15. The dry gas production system of claim 1 wherein said membrane dryer is configured to produce a stream of dry gas from a stream of ambient air supplied from said compressor, and said at least one dry gas production module further comprises a flow sensor configured to sense a fluid flow rate of said stream of dry gas and to produce an output signal representative of the sensed fluid flow rate.

16. The dry gas production system of claim 15 further comprising:

an electronic controller electrically coupled with said flow rate sensor, said electronic controller configured to determine a change in the fluid flow rate based upon a change in the output signal.

* * * * *

UNITED STATES PATENT AND TRADEMARK OFFICE
CERTIFICATE OF CORRECTION

PATENT NO. : 7,481,869 B2  Page 1 of 1
APPLICATION NO. : 11/205848
DATED : January 27, 2009
INVENTOR(S) : Troy I. Vanderhoof et al.

It is certified that error appears in the above-identified patent and that said Letters Patent is hereby corrected as shown below:

On the Title Pg. Item (56), first column. Delete the first U.S. Patent reference listed (Cibie) under References Cited.

On the Title Pg. Item (56), second column. Delete the last U.S. Patent reference listed (Nino) in the References Cited area.

Column 14, claim 8, line 18, change "comprise" to --comprises--.

Signed and Sealed this

Thirteenth Day of October, 2009

David J. Kappos
*Director of the United States Patent and Trademark Office*